United States Patent
Kumar et al.

(10) Patent No.: US 6,907,563 B1
(45) Date of Patent: Jun. 14, 2005

(54) SYSTEM AND METHOD FOR COMPOSING HETEROGENEOUS MEDIA COMPONENTS INTO A UNIFIED ENVIRONMENT FOR RICH SPATIO-TEMPORAL HOTLINK AUTHORING AND ACTION ENABLEMENT IN LOW-BANDWIDTH PRESENTATIONS

(75) Inventors: Keeranoor G. Kumar, Randolph, NJ (US); Sih-Pin Subrina Chang, Old Tappan, NJ (US); Shu-Chun Jeane Chen, Chappaqua, NY (US); James S. Lipscomb, Yorktown Heights, NY (US); Jai Menon, Alpharetta, GA (US); Arun Ramchandra, Danbury, CT (US); Liang-Jie Zhang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/572,894

(22) Filed: May 18, 2000

Related U.S. Application Data (60) Provisional application No. 60/136,389, filed on May 27, 1999.

(51) Int. Cl.[7] ............................. G06G 17/00; G09G 5/00
(52) U.S. Cl. ................................ 715/501.1; 715/500.1; 715/513; 715/749; 715/762
(58) Field of Search ........................... 715/500.1, 501.1, 715/513; 345/762, 749, 761, 756

(56) References Cited

U.S. PATENT DOCUMENTS

| | | | | |
|---|---|---|---|---|
| 6,317,761 B1 | * | 11/2001 | Landsman et al. | 715/513 |
| 6,356,921 B1 | * | 3/2002 | Kumar et al. | 715/501.1 |
| 6,553,393 B1 | * | 4/2003 | Eilbott et al. | 715/513 |
| 6,601,009 B2 | * | 7/2003 | Florschuetz | 702/124 |
| 6,687,737 B2 | * | 2/2004 | Landsman et al. | 709/203 |
| 2003/0187811 A1 | * | 10/2003 | Chang et al. | 707/1 |

OTHER PUBLICATIONS

Microsoft Press Computer Dictionary, Third Edition, 1997, pp. 290 & 459.*

Keeranoor et al. "The HotMedia Architecture: Progressive & Interactive Rich Media for the Internet" IBM Research Report; No. 21519(97069); Aug. 19, 1999; pp 1–22.

* cited by examiner

Primary Examiner—Stephen S. Hong
Assistant Examiner—Adam L. Basehoar
(74) Attorney, Agent, or Firm—Paul J. Otterstedt (57) ABSTRACT

A system and method composes heterogeneous media components into a unified environment for rich spatio-temporal hotlink authoring and action enablement in low-bandwidth presentations. The media client master coupled to the server receives a first heterogeneous media file. The master parses the file to identify the various media tracks in the file, their types, and the object which would render them. When the master encounters a media frame, an internal table is checked to verify whether a media object has been instantiated to handle the corresponding media track. If not, the master fetches the appropriate object from the server and instantiates the object in the media track. The master verifies the frame to determine if an action enablement kernel has been created. If not, the master fetches the appropriate object from the server and instantiates the object in the frame, to activate an action enabler for display of the action.

31 Claims, 6 Drawing Sheets

FIG. 3A ACTION ENABLEMENT SCHEMATIC

① INPUT DEVICE SENDS X-Y VALUES TO PANORAMA MEDIA.
② PANORAMA MEDIA QUERIES ACTION HANDLER FOR HOT SPOT.
③ ACTION HANDLER RETURNS HOT SPOT UNDER INPUT DEVICE.
④ PANORAMA MEDIA DISPLAYS PANORAMA, HOT SPOT, AND INPUT DEVICE CURSOR.

SYSTEM AND METHOD FOR COMPOSING HETEROGENEOUS MEDIA COMPONENTS INTO A UNIFIED ENVIRONMENT FOR RICH SPATIO-TEMPORAL HOTLINK AUTHORING AND ACTION ENABLEMENT IN LOW-BANDWIDTH PRESENTATIONS

This application claims the benefit of the filing date of provisional application No. 60/136,389, filed May 27, 1999 and assigned to the same assignee as that of the present invention.

RELATED APPLICATIONS (1) Ser. No. 09/376,102, entitled "Secure Electronic Content Distributions on CDS and DVDS," filed Aug. 17, 1999 (SE9-98-033).

(2) Ser. No. 09/169,836, entitled "Personalizing which Media Presentation Based on User Response to the Presentation," filed Oct. 9, 1998 (SE9-98-028).

(3) Ser. No. 09/100,418, entitled "Progressive Interleaved Delivery of Interactive Descriptions and Renderers for Electronic Publishing of Merchandise," filed Jun. 20, 1998 (SE9-98-004).

(4) Ser. No. 09/442,585, entitled "System and Method for Adaptive Delivery of Rich Media Content to a User in a Network Based on Real Time Bandwidth Measurement & Prediction According to Available User Bandwidth" filed Nov. 23, 1999 (SE9-99-011/1963-7340).

(5) Ser. No. 09/438,493 entitled "A System and Method of Enriching Non-Linkable Media Representation to the Network by Enabling an Overlying Hotlink Canvass" filed Nov. 12, 1999 (SE9-99-012/1963-7341).

6) Ser. No. 60/136,390 entitled "A System and Method for Non-Linear Transformation and Interpolation for Unifying Hotlinks between Heterogeneous Media Representations". filed May 27, 1999 (SE9-99-004/1963-7332).

BACKGROUND OF THE INVENTION (1) Field of the Invention:

This invention relates to multimedia systems hotlinking between media. More particularly, the invention relates to multimedia systems invoking one media from another by means of a hotlink or a program and action enablement.

(2) Background Discussion:

The context of the invention is the presentation of heterogeneous rich-media content to users over the Internet to communicate objects, ideas and solutions. The invention concerns the enablement of actions generically during the course of such presentations. Hotlinking from one presentation to another would be a familiar and specific example of such a capability. The problem of action enabling may be described as one of triggering actions on encountering actionable situations. The actionable situation would be a combination of spatio-temporal contexts in the presentation of media as well as user input and media player state events. The scope of the triggered actions includes not only switching presentation state or segment, but also bringing in new presentation content, changing the look-and-feel and even performing actions which are outside the scope of media itself such as enabling an e-business transaction.

The challenge is to build an apparatus for action enablement that facilitates the following:

1. A content creator's expression of his/her selection of actionable situations and associated actions, where both are picked from a set of possible expressions supplied as a standard offering with the framework or belong to enhancements to it.

2. A media type creator's ability to introduce his/her new actionable situations.

3. A media type creator's ability to provide functions that assist in the identification of actionable situations.

4. An application developer's ability to override the default functions that handle specific actions.

5. An application developer's ability to introduce his/her new actions.

SUMMARY OF THE INVENTION

An object of the invention is an apparatus and method in a multimedia system for facilitating the activation on a client of programmatic consequences (henceforth referred to as actions) in response to triggers which are either the change of state events during a rich media presentation, user interactions with the presentation, or both.

Another object is an apparatus and method in a multimedia system wherein the activation of the actions is in response to a combination of a trigger as well as the occurrence of a spatio-temporal context during a rich media presentation.

Another object is an apparatus and a method in a multimedia system wherein the media data for rich media presentations and meta data for facilitating the activation of the actions are separated and handled by distinct entities on a client station.

Another object is an apparatus and a method in a multimedia system wherein an instance of a media object is created on a client station b to render a specific rich media type on the client and will be the one that receives the media data associated with that rich media type.

Another object is an apparatus and method in a multimedia system wherein an action enabler which is distinct from the media objects, handles the activation of the actions, and handles the actions associated with all rich media types in a presentation.

Another object is an apparatus and a method wherein an action enabler is responsible for the verification of occurrence of a trigger as well as a spatio-temporal context as an actionable situation during a rich media presentation.

Another object is an apparatus and a method wherein an action enabler is also responsible for activation of actions.

These and other object features and advantages are achieved in a system and method, which compose heterogeneous media components into a unified environment for rich spatio-temporal hotlink authoring and action enablement in low-bandwidth presentations. The system includes a content creator and delivery station coupled to a network for delivery of rich media presentations to at least one client station including presentation and user interaction logic. The client station facilitates the activation on a client of programmatic consequences or actions in response to triggers which are either the change of state events during a rich media presentation or user interactions with the presentation, or both. The presentation and user interaction logic includes a client master control module coupled to at least one action handler. A content creator creates media, for example, stills, animation, panorama including "hotspot" for delivery to the client station and display as a projected image for user interaction with the "hotspot". The media client master coupled to the server receives a first heterogeneous Rich Media file. The master parses the file to identify the various media tracks in the file their types and the object, which would render them. The frames that follow the file header may be a type of media or meta. When the master encounters a media frame, an internal table is checked to verify whether a media object has been instantiated to handle the corresponding media track. If not, the master fetches the appropriate object from the server and instantiates the object in the media track for display of an actionable situations and interaction with the user. The Rich Media file may contain meta frames with ranges and action subtype. The master verifies the frame to determine if an action enablement kernel has been created. If not, the master fetches the appropriate object from the server and instantiates the object in the frame, which uses the range and action subtypes to activate an action enabler for display of the action to the user and interaction therewith.

DESCRIPTION OF THE DRAWING

The invention will be further understood from a detailed description of a preferred embodiment taken in conjunction with an appended drawing, in which.

DESCRIPTION OF PREFERRED EMBODIMENT

Figure 1:
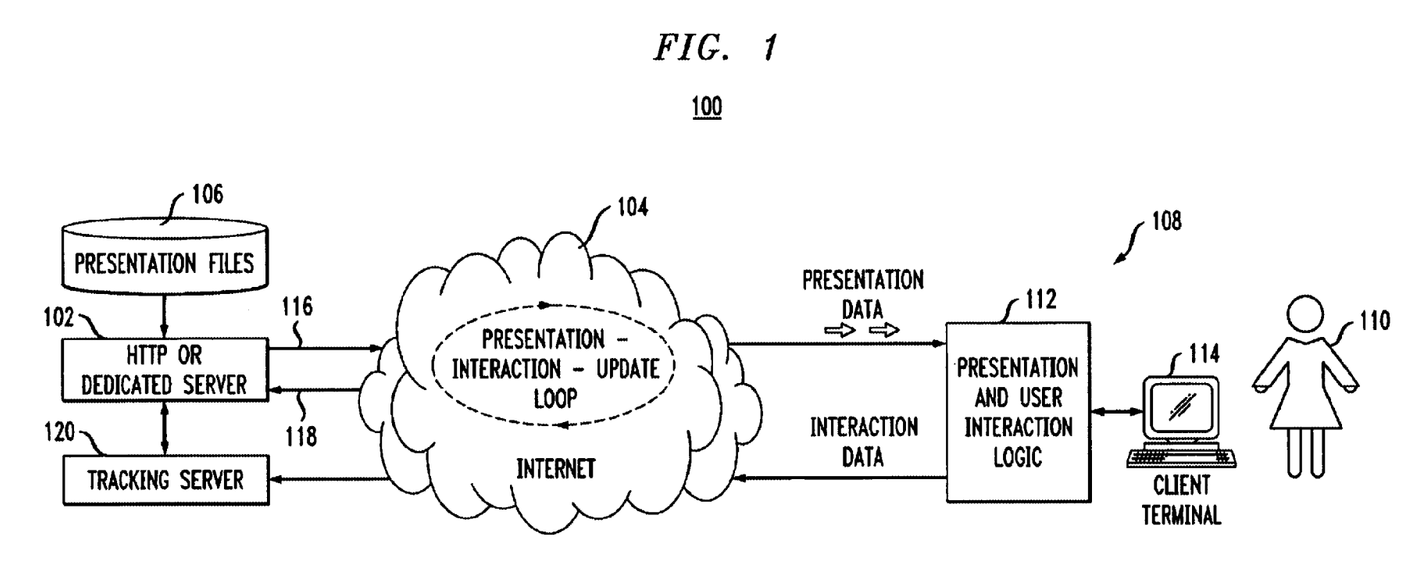
FIG. 1 is a representation of a content creator delivery server providing rich media in a data stream via a network to a client station where the client station includes a master control module and action handlers for responding to "hotspot" in the rich media in accordance with the principles of the invention.

In FIG. 1, a multimedia information system 100 implements HotMedia architecture and includes an HTTP or dedicated server 102 coupled to a multimedia network 104, typically the Internet. The server is further coupled to a storage media 106 which stores presentation files in rich media created by a standard authoring tool (not shown) for delivery to a client station 108 coupled to the network and serving a user 110. The client station includes presentation and user interaction logic 112 accessed by the user through a client terminal device 114. The presentation files 106 are supplied to the client station as streaming data on a presentation bus 116. The user's interaction with the presentation is returned to the server 102 as interaction data on bus 118. The presentation files interaction data are exchanged in the network between the server and the client station standard HTTP protocol. A user interaction-tracking server 120 monitors the user intention, preference and attitudes with respect to the presentation files and exchanges data with the server 102. The details of the system 100 are further described in Ser. No. 09/268,537 entitled "Framework for Progressive Hierarchical and Adaptive Delivery Rich Media Presentation and Associated Meta Data", supra.

Figure 2:
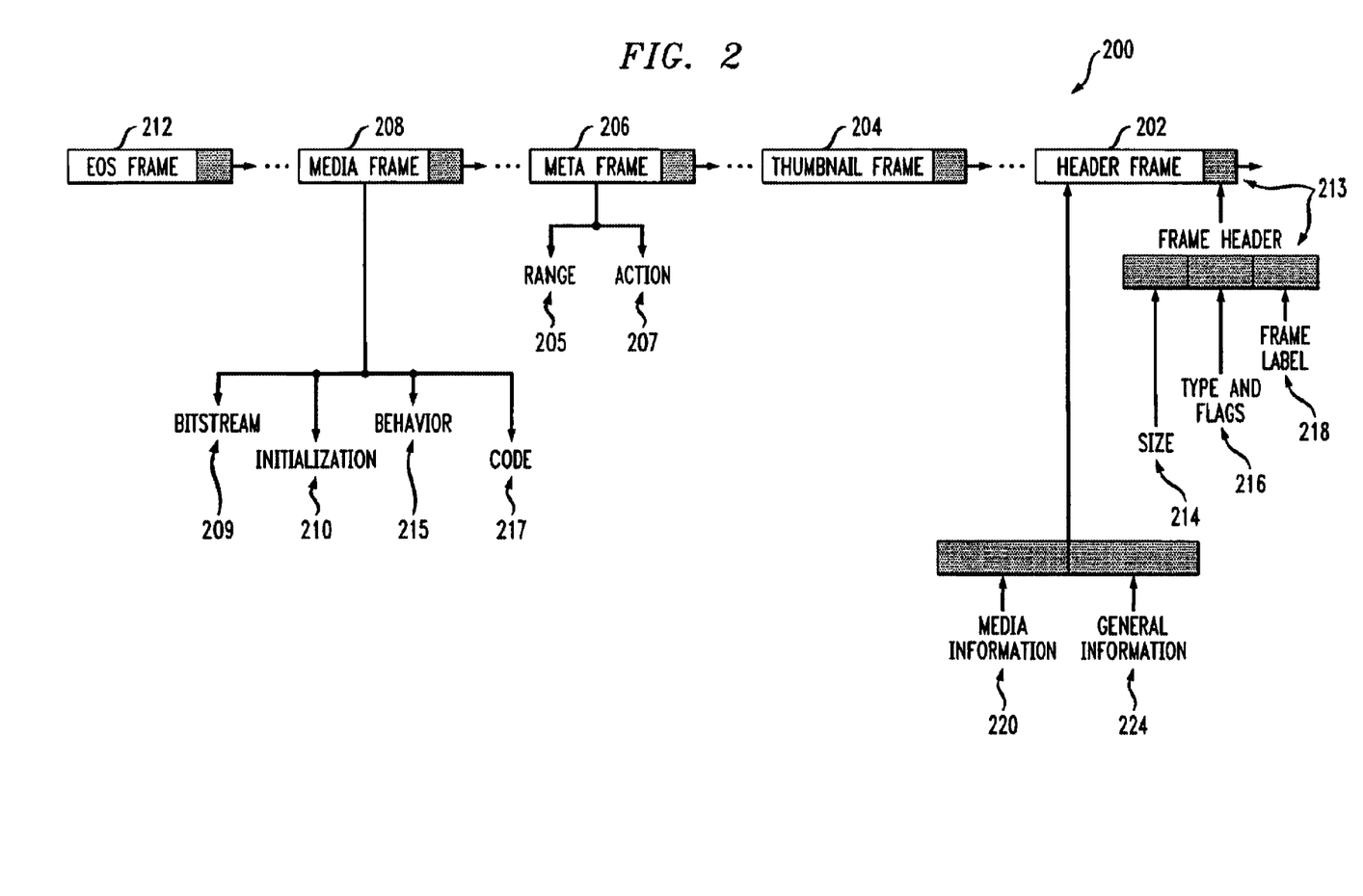
FIG. 2 is a representation of the data stream in the system of FIG. 1.

FIG. 2 shows a HotMedia presentation file 200 which is essentially a sequence of frames types comprising header 202, thumbnail 204, meta 206, media 208, and an end of stream 212. The first frame is the header frame 202. The header frame is actually followed by the thumbnail frame 204. After these frames a sequence of other frames occurs and in no pre-mandated order or number. The header frame 202 is the only one whose presence is mandatory in the format. The most degenerate yet useful version would have a header frame followed by a thumbnail frame 204. Media frames 208 appear in all other instances. Meta frames 206 are present only in cases where non-default behavior and configuration are desired on cases where hyper linked action semantics are to be incorporated. The information for adaptive delivery option is stored in Meta frames 206. All frames have a similar 12 bit initial section 213 that enables a uniform procedure for their identification to a type and frame label as well as the determination of their size. The HotMedia file format is created to have minimum overhead and maximum modularity. The format makes it suitable for optimal delivery of a low bandwidth as well as for rich experiences over high bandwidth.

The header frame 202 includes a frame header 213, which provides information about frame size 214, types and flags 216 and frame labels 218. The header frame 202 also includes media information 220 containing definition on different media tracks that may be contained in the file. General information 224 in the header frame 202 provides the class name of the code that renders the media type on the client station. When HotMedia kernel code in the content presentation software in CPU 51 parses the media track information on the file header and if it encounters the specification of a class name, the media type field is ignored and the code specified by the class name is sent from the delivery server 30 in order to render the data of the track in question. The class name permits the introduction of whole new media types into the presentation. No changes or additions to the client kernel code are needed so long as the media objects implements the interfaces specified in the HotMedia framework 201 for first class members of a media object set.

The thumbnail frames 204 carry a minimalistic representation of the information shared by the HotMedia file framework 201. For example, if the information carried in the file were a description of merchandise, the thumbnail would carry a single image. Thumbnail frames make possible providing the user a quick introduction to the subject with minimal code and data transfer. Since users pay attention to detail only when the subject is of some interest, it would be wasteful for such data and codes to enable anything beyond the initial experience unless an interest is indicated. In addition to a frame header, the thumbnail frames also carry parameters for producing image pan and animation effects on the single image (all not shown).

Meta frames 206 carry specification of non-media specific information pertaining to enablement of hyper linked actions from media context, tracking of interaction and adaptive delivery of rich media content. Action semantics associated with media segments can be expressed in HotMedia files 200 using range 205 and action subtypes 207. Range frames 205 are made up of range records that identify and label spatio-temporal segments of media. A spatial range can be described by a rectangular or elliptical contour. Temporal ranges can refer to a time range in milliseconds for a real time media-like audio or a count range for non-real-time media like animation. The range specification can also express a combination of space and time.

Action records 207 may be pre-programmed into the HotMedia file 200 for the execution of many types of action in the context of a presentation. Action frames can carry multiple action records all pertaining to a single actionable context, namely the presentation of media segment as specified by a range. Action records are the specification mechanism for all types of actions that can be triggered during the context of presenting a certain media segment while in a certain state of the media object. Actions can belong to a variety of types that include LINK to specify hyperlinking; DISPLAY used to specify the display of contours, cursor changes, etc; PLAY SOUND used to create sound effects in various contexts; TRACK used to specify the tracking of interactions and events associated with a user experience; TOOL TIPS used to extract a piece of text that is embedded in the action frame, and ADAPT DELIVERY used to specify the dynamic delivery of rich media content adapting to the available user bandwidth. Also contained in an action record is the specification of an action trigger. The triggers for actions can be user interaction, presentation state updates or player state updates. An example of would be the coming in to view of a certain segment of a presentation, the movement of mouse into a spatio-temporal range of a presentation, the click of the left mouse button within the present temporal range of the presentation, the completion of loading of a segment of the media data and so forth. Although the range record specifying a media segment associated with most action triggers are of type spatial, temporal or both there are some situations where the range type is inconsequential. A range type DONTCARE is designed for such situations. An example is where the action is determined entirely by the internal state of the media object producing the completion of a data-loading trigger. The final piece of information contained in an action record is the data for action. The size of this data and its interpretation is different for each action type and subtype. The data information is where for example, the target URL string is found when the action type is LINK and the color information when the action type is DISPLAY.

The media frame 208 contains media bit stream data 209, initialization data 210, behavior data 215 and code 217. The behavior data or initialization data define the page and configuration of a corresponding media player respectively. Media bit stream data belonging to a particular media track and can be carried over multiple frames and these frames can be interlinked with meta frames and frames belonging to other media tracks. Media frames are identified by frame type and track identifier as carried in their header 213. The frame type and track identifier enable true multiplexed delivery and hence ideal for static or dynamic proportioning of various media tracks over limited bandwidth. Media frames can also often contain codes 217 that render the media type on the client station. The code in turn can be physically present or could be a URL reference. When present, the code is separated from the file on the server side 30 (see FIG. 1), and thereafter the code or data can be made available for on demand delivery. In the case of a URL reference to code, the code is fetched from a remote HTTP server to be similarly made available on demand.

The end-of-stream frame 212 is a marker that signals the end of the entire presentation associated with the HotMedia file 200. Frames belonging to multiple media tracks and meta data can be multiplexed in the HotMedia file. The end of stream frame is valuable to the client station in recognizing the end of each HotMedia file data stream, which may otherwise be impossible, when stream initialization data for each stream do not announce their respective lengths.

Further details on the HotMedia file format are described in IBM Research Report RC 21519[97069] entitled "The HotMedia Architecture: Progressive and Interactive Media for the Internet", dated July_1999, available from IBM Research, Yorktown, N.Y. 10598, and fully incorporated herein by reference.

Figure 3A:
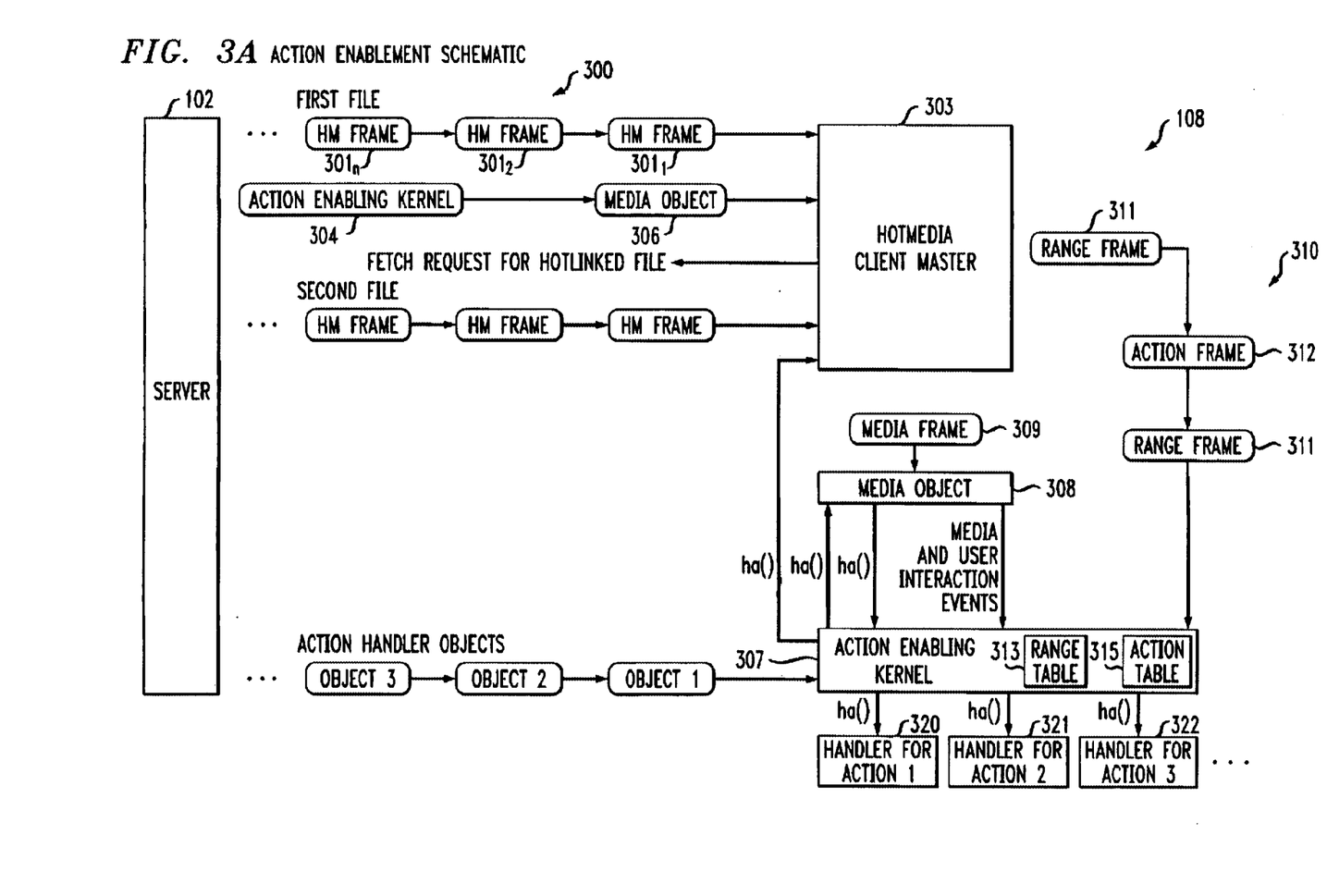
FIG. 3A is a representation of a master module and action enabler in the client station of FIG. 1 for selecting a hotspot and displaying the hotspot on a projected image at the client station.
Figure 3B:
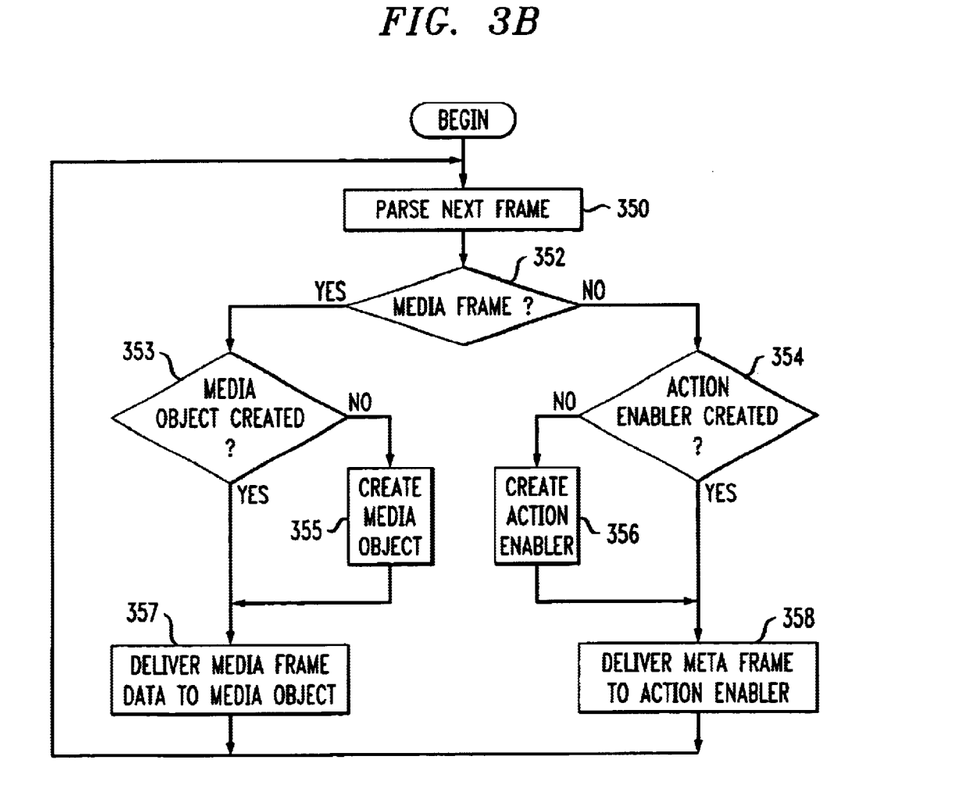
FIG. 3B is a flow diagram for processing data streams in the system of FIG. 1.

Turning to FIGS. 3A, B, and C, the client station 108 will now be described in conjunction with FIGS. 1 and 2 in processing a presentation file 106 in the format of the data stream 200 for interaction with a user(s) responding to the hotspots. In FIG. 3, the server 102 provides a first streaming HotMedia file 300 comprising a series of frames $301_1 \ldots 301_n$ previously described in conjunction with FIG. 2. The frames $301_1 \ldots 301_n$ may contain Meta frames with range and action subtext. In FIG. 3B, a HotMedia client master 303 receives and parses the frames 300 in step 350. A test 352 is performed to determine if a media frame is present. In step 354, a "no" condition indicates a Meta frame is encountered with range and action subtext, and the master determines if an action enable kernel 304 has been created in a test 354. If not, in step 356, the master 303 obtain action enabling kernel codes 304 and media object codes 306 from the server 102 and instantiates the codes 304 in an action enable kernel 307. In step 358, meta frames 310 with range subtext 311 and action subtext 312 are delivered to the action enabling kernel 307 which stores the range and action subtexts in tables 313 and 315, respectively. The action-enabling kernel 307 activates an action handler 320, 321, 322 according to the event linked to the hotspot. For example, an action handler for sound takes an audio clip that is embedded in an action frame and plays the sound out using the sound player of the client machine. An action handler for Link extracts an internet address embedded in the action frame and invokes the web browser's hyperlinking capabilities to take the user to that internet site. An action handler for ToolTips extracts a piece of text that is embedded in the action frame and displays it in a text box that it creates to appear on top of the presentation material. In general, an action handler is software that performs a specific well-recognized action making use of standard capabilities of the platform or environment in the process.

Returning to test 352 a "yes" condition indicates media frames 309, which are delivered to the media object 308 handling the media track in, step 353. A "no' condition creates a media object in step 355. A "yes' condition delivers the media frame to the media object in step 357, after which the processing of the next frame begins.

The centralized action enabler 307 also allows decoupling of events from the hotspot in the display. The media hands off mouse clicks and view changes to the action enabler, which can then test for mouse within polygon or polygon touching polygon or polygon within polygon and then performing action without the media needing any action code. The centralized action enabler need not know what media specific non-linear mapping is used between the media and projected image. The media handles all non-linearities, which differ from one media to the next so that the centralized action enabler need not have special code to deal with not even to the point of doing a call back to the media. For example, hotspot in media space is mapped into a projected image by the media before display. Another example, a mouse click in a projected area is mapped to the media space by the media before being sent to the action enabler. More specific details on the operation of the client station are described in Ser. No. 09/438,493 entitled "A System and Method of Enriching Non-Linkable Media Representations in a Network by Enabling an Overlying Hotlink Canvas," supra.

Figure 3C:
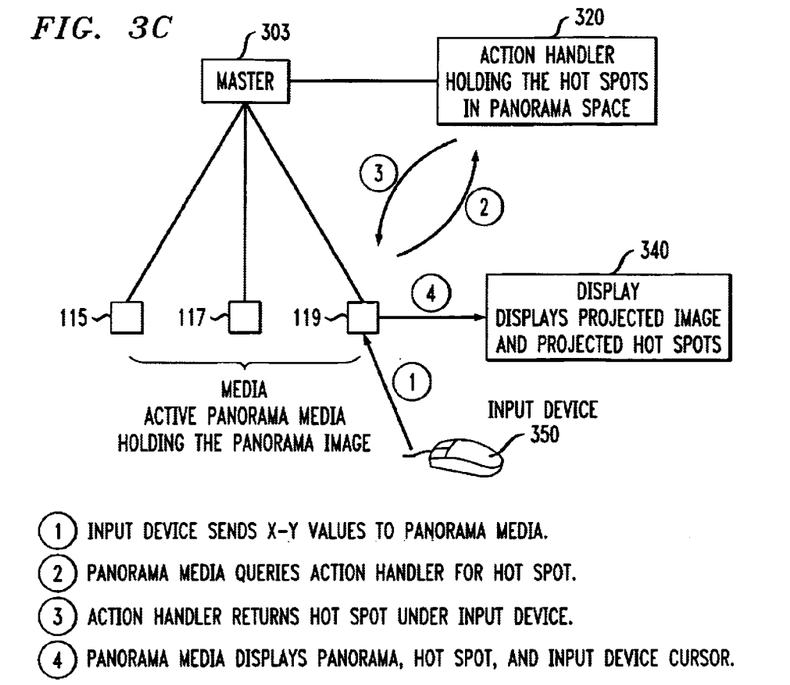
FIG. 3C is a flow diagram for processing a hotspot in the flow of information between a server and a client station in the system of FIG. 1.

FIG. 3C shows another view of the flow of information between the server 102 and the client station 108 in processing a hotspot. An input device 110 is used to pick a hotspot in the projected image in step 1. The coordinate values of the pick are sent to the media server 102 providing media tracks 115, 117, 119. The media server 102 transforms the input pick coordinates and queries the action handler 320 in the client station for stored hotspot at the location of the input device in step 2. The action handler returns the hotspot locations, if any, at the query location to the media server 102 in step 3. In step 4, the media server displays the hotspot in the projected image in the client terminal 340 at the input device location known to media in step 3. When the pick falls within the media hotspot area, the action handler or media initiates events associated with the picked hotspot in the projected image.

Having described the system in which rich media are transmitted between the server and the client station, a description will now be provided for action enablement in the system of FIG. 1. Action enablement is not a default function in the client. The client, who initially comprises of just the client master object, receives the first heterogeneous Rich Media file from the server as illustrated. By parsing the file header frame of this file the Master comes to know about the various media tracks involved in the file, their types and the objects that would render them. The frames that follow the file header frame could be of type media or Meta. As soon as the master encounters a media frame, it checks its internal table to verify whether a media object has been instantiated to handle the corresponding media track. If not, it fetches the appropriate object from the server and instantiates it as illustrated. Similarly, as illustrated, the first Rich Media file arriving from the server may contain Meta frames with range and action subtype. As soon as the Master encounters the first of these, it verifies to see if the action enablement kernel object has been created. If not, it fetches the appropriate object from the server and instantiates it as illustrated. Being the entity that receives the Rich Media file, the master takes responsibility to deliver frames to their proper owner. As shown, media frames are delivered to the object handling the corresponding media track, and Meta frames of the range/action variety are delivered to the action enablement kernel object.

A media object may use the action enablement capabilities offered by the action enablement kernel if it so desires. The action enablement framework in this invention has the following aspects:

1. Spatio-temporal contexts in the media presentation, henceforth referred to as ranges, are identified and indexed.
2. Actionable situations are specified as the combination of ranges and triggers, where the latter corresponds to user input and media object state events.
3. Programmatic consequences are linked to actionable situations and the expression of this combination, henceforth referred to as actions in this document, are identified and indexed.
4. A media object raises events into the action enablement kernel signaling the occurrence of a trigger.
5. The action enablement kernel, on receiving a trigger-related event, verifies whether one or more actionable situations have arisen, and returns to the media object a vector of indices that correspond to the actions linked to these situations.
6. The media object, on receiving the vector of action indices, inspects the actions and is permitted but not required to handle them.
7. The action enablement kernel provides public methods for the media object to fetch parameters related to the action which include the action type, the spatio-temporal context definition and the action specific data byte-array.
8. The action enablement kernel also provides a public method to the media object so the media object can call the kernel to perform the action corresponding to a given index.

Aspects 1, 2 and 3 above relate to the specification of the Meta information pertaining to action hyperlinked into media presentations. The Rich Media files in our framework carry all such meta information as range and action frames. The process of building range and action tables will be described in FIG. 4 in conjunction with FIGS. 1, 2 and 3A.

Figure 4:
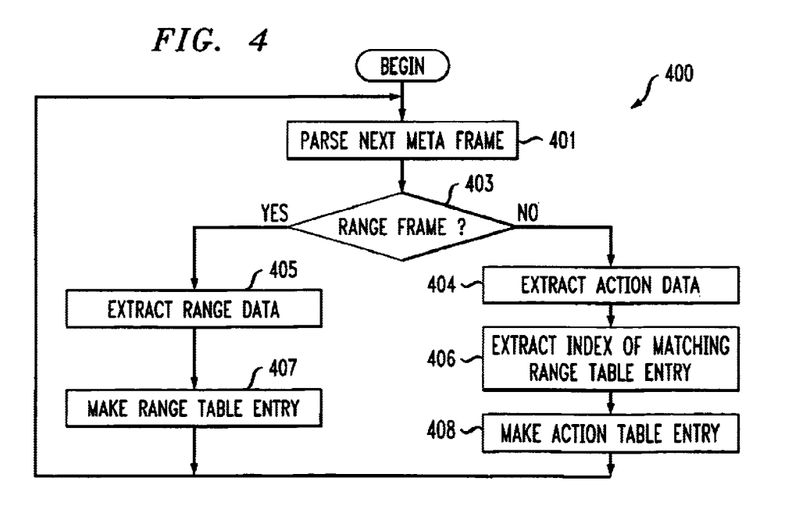
FIG. 4 is a flow diagram for extracting range and action data in the data stream of FIG. 2.

In FIG. 4, the action enablement kernel 307 receives and maintains all such information, and media objects are fairly insulated from their internal representation as well as verifying actionable situations in a process 400. In step 401, the client master 303 parses all frames 200 in step 401. A test 403 is performed to determine if range and action data are present in the parsed frames. The action enablement kernel builds range and action tables out of the information contained in the range and action frames respectively. A "yes" condition extracts range data in step 405. An entry is created in the range table corresponding to each range record in the arriving range frames in step 407. The information contained in the range record is used as data for this entry. The table can contain entries corresponding to ranges referring to any media track in the file and no particular order is mandated.

Similarly, in test 403 a "no" condition extracts action data in step 404. An entry is created in an action table corresponding to each action record in the arriving action frames. In step 406 a cross-reference index is also added to a matching range table entry containing the description of the range with which the action in question is associated. In step 408, an entry is made into an action table related to the frame.

Media authoring tools are involved in the creation of range information. They then hand this information over to the authoring tool of our invention which not only encodes these ranges into the file, but also enables the association of any action from a large collection to be associated with it along with the specification of a trigger.

Aspects 4 through 8 above are concerned with the invocation of action hyperlinked in Rich Media presentations. As a media object receives media related data from the Master and commences the rendering of the media, it will also be receiving user input into its media space through mouse and keyboard interactions, or through user interface components and the media control interface. The media object may also be undergoing internal state changes pertaining to the completion of data loading, commencement of rendering and so forth. The media object can signal the occurrence of this user input or state changes, as the case may be, to the Action enablement kernel. On receiving them, the Action enablement kernel regards these signals as triggers and as the occasion to verify the presence of an actionable situation. When relevant to the media object in question, triggers can be associated with the display of every new image, mouse activity within the window and media object state changes such as the completion of loading of all images. It is entirely up to the media object as to which triggers it chooses to send to the Action enablement kernel. A trigger corresponding to a left mouse click, referred to as the LEFT_CLICK trigger, carries with it the mouse position as well as the frame numbers as a parameter. Similarly, a trigger corresponding to a "view change" in the media presentation is referred to as the VIEW_CHANGE trigger. Exactly what constitutes a view change is media dependent and is also in many situations subject to a granularity choice. In the case of animation image flip, zoom and pan can all represent view change events. In the case of a video media object, a view change event may be associated for example with a rendering granularity of 50 milliseconds. The VIEW_CHANGE trigger carries with it image number (or millisecond value) and the view window contour information transformed into the same coordinate system in which ranges are expressed. In general the view is therefore a polygon. In a simple example such as for video involving only a rectangular space the view contour received by the kernel is also a rectangle.

Figure 5:
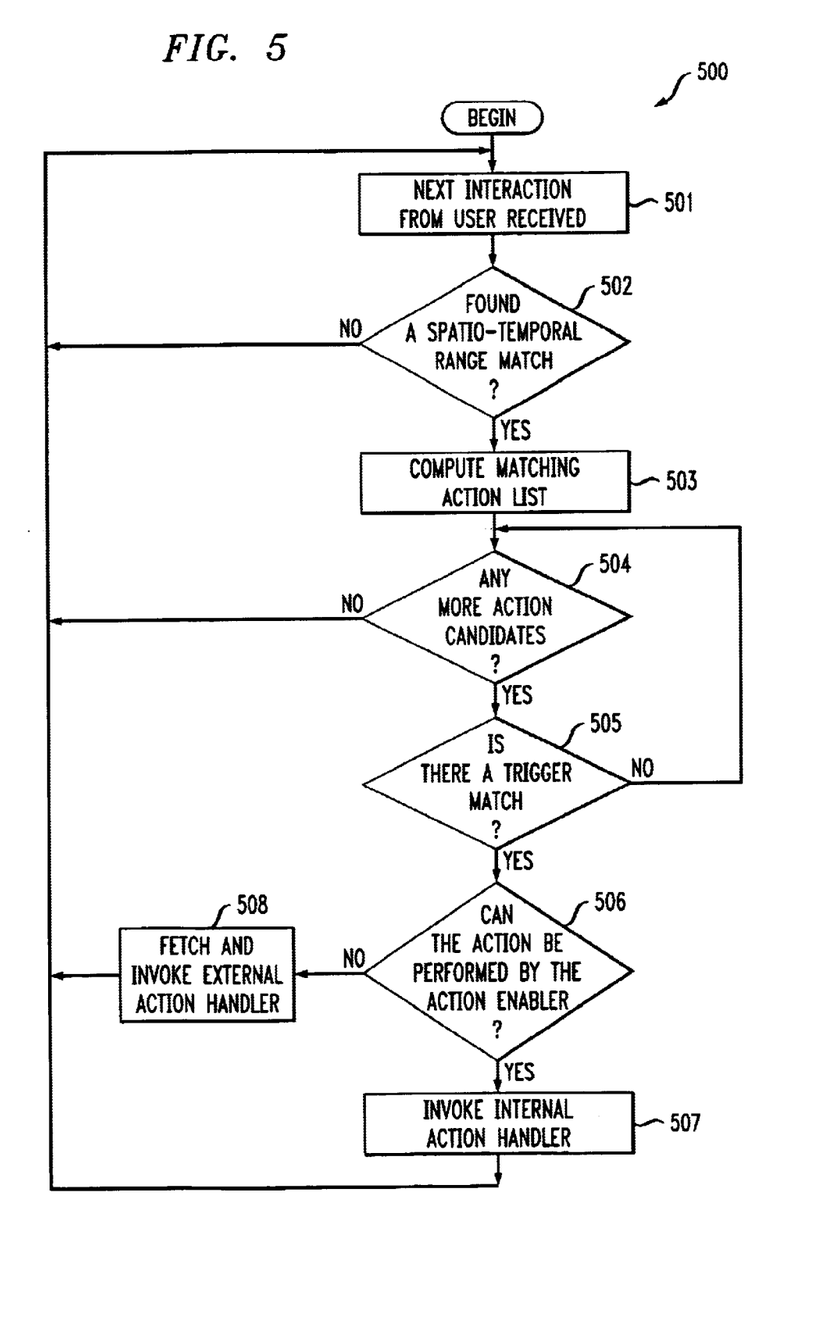
FIG. 5 is a flow diagram of invoking an action handler in the system of FIG. 1

FIG. 5 shows a process 500 in which the action enablement kernel recognizes an actionable situation if any, given the current trigger and spatio-temporal context by consulting its internal tables that hold all ranges and actions in the file. In step 501, the most recently received handleMediaEvent( ) call associated with a VIEW_CHANGE trigger will be used by the kernel to provide the view parameters. In test 502, a spatio-temporal range is determined. A "no' condition returns the process to step 501. A "yes" condition initiates the computation of a matching action list in step 503. The current handleMediaEvent( ) call associated with the mouse click in question, would carry both the count of the frame on which the click was made as well as the mouse position of the click. It should be noted that the action enablement kernel specification uses a larger set of triggers when compared to the set it would receive from the media object. This is owing to the fact that some triggers could cause other triggers, which are more context dependent. For example, a MOUSE_MOVE may cause a MOUSE_ENTERS_RANGE, MOUSE_WITHIN_RANGE or MOUSE_EXITS_RANGE depending on where the mouse was previously. The media object should therefore be aware that the vector of actions that are returned to it on a handleMediaEvent( ) call could potentially include ones associated with other triggers. This should however be of no consequence to the media object since it is primarily concerned with the type of the resulting actions.

On receiving a vector of action indices as a return value for the handleMediaEvent( ) call, the media object has the opportunity to do the following:

1. Pick one among a set of contending action candidates in a test 504. A "no" condition returns the process to step 501. A "yes" condition resolves the conflict between competing candidates. For example, when the mouse is clicked on a position that falls within multiple ranges (e.g. in the case over overlapping hotspots), the media object can resolve the contention if any and pick one of them. A contention situation exists whenever each action will make the others meaningless. An example would be an action of type LINK and sub-type REPLACEURL.

2. A test 505 is performed to determine if a trigger match exists. A "no" condition returns the process to test 503 for the next action candidate. A "yes" condition initiates a test 506 to perform the action specified or an alternative action. A "yes" condition initiates a test 506 to determine if the action can be performed by the action enabler. For example, if the action type is DISPLAY and sub-type is RANGE_CONTOUR, a visual media object is ideally suited to perform this action and an internal action handler is invoked in a step 507. Alternatively, a visual media object can actually perform the action of displaying the range contour even when the action type is LINK as an additional experience to the end user. A "no" condition initiates step 508 in which the action is invoked through fetching an external action handler using the handleAction( ) method of the action enablement kernel. For example, when the action type is LINK, the media object would call the handleAction( ) method to actually perform this action.

A combination of all the above may be performed by the media object. For example, the media object may choose among a set of LINK action alternatives, display the range contour for the choice and follow that up with a call to handleAction( ) to execute that LINK action.

The LINK action belongs to a set of actions that are implemented as standard by the action enablement kernel itself. However, the action types that can be supported are not limited to this set and can include new custom ones that are introduced by a third-party application developer. An action handler object may have to be created by the action enablement kernel in order to carry out such custom actions as illustrated in the FIG. 5 above, and this may involve fetching the code for these actions from the server. The action enablement kernel assumes the responsibility to deliver data uninterrupted to such handler objects. On the content creation side, a content creator can either link a standard action or import a custom action into the framework. A custom action can have its own name/type and should specify the name of the handler that would perform the action on the client side.

What is claimed:

1. A method for facilitating the activation on a client of programmatic consequences or actions in response to triggers which are either the change of state events during a multimedia presentation or user interactions with the presentation, or both, comprising the steps of:

coupling a multimedia client master to a server;

receiving a first heterogeneous multimedia file at the master;

parsing the file to identify various media tracks in the file, their types and the object, which would render them;

checking an internal table to verify whether a media object has been instantiated in a frame to handle the corresponding media track;

if not, fetching the appropriate object from the server and instantiating the object in the media track;

verifying a meta frame to determine if an action enablement kernel has been created;

if not, fetching the appropriate object from the server and instantiating the object in the frame; and delivering the frames to their proper user, media frames being delivered to the object handling the corresponding track, and meta frames including range and action information being delivered to the action enablement kernel.

2. The method of claim 1 wherein the activation of the actions is in response to a combination of trigger as well as the occurrence of a spatio-temporal context during the multimedia presentation.

3. The method of claim 2 wherein media data for multimedia presentations and meta data for facilitating the activation of the actions are separated and handled by distinct entities on the client.

4. The method of claim 3 wherein an instance of a media object is created on the client to render a specific multimedia type on the client and will be the one that receives media data associated with that multimedia type.

5. The method of claim 4 wherein a kernel part of the client includes an action enabler, which is distinct from the media objects, and handles (i) the activation of the actions, and (ii), the actions associated with all multimedia types in the presentation.

6. The method of claim 5 wherein an action enabler is responsible for the verification of occurrence of a trigger as well as a spatio-temporal context during a multimedia presentation, as an actionable situation.

7. The method of claim 6 wherein an action enabler is also responsible for activation of actions.

8. The method of claim 7 wherein the action enabler fetches new code from the server in order to activate an action.

9. The method of claim 7 wherein a media object instance created to render a multimedia data stream sends events to the action enabler with the occurrence of each trigger.

10. The method of claim 9 wherein the events sent by the media object to the action enabler contains spatio-temporal position information, which the action enabler users to verify spatio-temporal contexts.

11. The method of claim 10 wherein every time the action enabler encounters one or more actionable situations, the media object is informed about the situations.

12. The method of claim 11 wherein on receiving information from the action enabler about actionable situations, the media object takes responsibility for activating some of the actions.

13. The method of claim 12 wherein the actions for which the media takes responsibility includes displaying hotlink contours, text and cursor changes.

14. The method of claim 11 wherein on receiving information from the action enabler about actionable situations, the media object selects and orders the actions to be carried out and calls back the action enabler to carry them out.

15. The method of claim 14 wherein the selection that the media object executes results in the picking of one among several overlapping hotlinks for each temporal and mouse position.

16. The method of claim 15 facilitating the authoring of actions in response to actionable situations, during the creation of a multimedia presentation, wherein the specification of actions and actionable situations are cleanly decoupled.

17. The method of claim 16 wherein the actions can refer to media related consequences such as changing the presentation state, position or content.

18. The method of claim 16 wherein the actions can refer to non-media related consequences such as invoking a computation on the client or initiating a communication or transaction with the server.

19. The method of claim 16 wherein the spatio-temporal range specification included in the specification of the actionable situation is defined by a media type specific authoring component.

20. The method of claim 19 wherein an authoring application enables a content creator to combine a spatio-temporal range created with a trigger selected from a large set of triggers to define the actionable situation.

21. The method of claim 20 wherein the authoring application enables the content creator to link an actionable situation specified with an action selected from a large set of possible actions.

22. The method of claim 20 wherein multiple actions can be linked to multiple actionable situations all involving the same spatio-temporal range specification.

23. The method of claim 16 wherein new actions can be introduced into a data framework at the time of authoring by assigning the actions a new type and by identifying a code that will carry out that action on the client in a corresponding action specification.

24. The method of claim 16 wherein action specifications can be created to carry data to the client where the data content and format is specific to the action type.

25. The method of claim 23 wherein in a situation where two actions have the same consequence, one action can refer to the data carried by the other action in order to optimize the size of data sent to the client.

26. A multimedia system for action enablement in a a multimedia presentation viewed by a user at a client station comprising:

means coupling a multimedia client master in the client station to a server;

server means sending a heterogeneous multimedia file having at least one track to the multimedia client master;

multimedia client master means parsing the file to identify media track(s) in the file, their type(s) and media object(s) for rendering to the user;

means checking an internal table in the multimedia client master to verify whether a media object has been instantiated in a media frame in the multimedia file to handle a corresponding media track;

means fetching the appropriate object from the server and instantiating the object in the media track if the media object has not been instantiated;

means verifying a meta frame to determine if an action enablement kernel has been created;

means fetching the appropriate object from the server and instantiating the object in the frame if the action enablement kernel has not been created; and means delivering the frames to the user for interaction with the media.

27. The system of claim 26 wherein the media track includes media frames and meta frames; and action enablement kernel means responsive to meta frames for initiating an action enabler to carry out an actionable situation in the media track.

28. The system of claim 27 further comprising:

means for activating actions in the media and meta frames by distinct entities.

29. The system of claim 28 further comprising:

means for generating triggers signifying a change in the state of events during a multimedia presentation to the user or user interaction with the presentation.

30. The system of claim 29 further comprising:

means for activating an actionable situation in response to a combination of a trigger and an occurrence of a spatio-temporal context during the multimedia presentation to the user.

31. An article of manufacture comprising a machine readable medium containing one or more programs which when executed implement the steps of:

composing heterogeneous media components into a unified environment for rich spatio-temporal hotlink authoring and action enablement in a multimedia system for interaction with at least one user including a server coupled to a content creator station and to a client station via a network, comprising:

receiving a first heterogeneous multimedia file as a series of frames at the client station and parsing the file to identify various media tracks in the file, their types and the objects which would render them;

checking an internal table in the client station to verify whether a media object has been instantiated in a frame to handle the corresponding media track;

fetching the appropriate object from the server and instantiating the object in the media track if a media object has not been instantiated in the frame;

verifying a metal frame to determine if an action enablement kernel has been created;

fetching the appropriate object from the server and instantiating the object in the frame if an action enablement kernel has not been created; and delivering the frames to their proper user, media frames being delivered to the object handling the corresponding track, and meta frames including range and action information being delivered to the action enablement kernel.

* * * * *

UNITED STATES PATENT AND TRADEMARK OFFICE
CERTIFICATE OF CORRECTION

PATENT NO. : 6,907,563 B1
DATED : June 14, 2005
INVENTOR(S) : K.G. Kumar et al.

It is certified that error appears in the above-identified patent and that said Letters Patent is hereby corrected as shown below:

Column 12,
Line 13, delete "a" after the word "in".

Signed and Sealed this

Sixteenth Day of August, 2005

JON W. DUDAS
*Director of the United States Patent and Trademark Office*